SIGNALING SYSTEM

Filed Nov. 16, 1959

INVENTORS
RENATO A. D'ANTONIO
FRED GERRAND
BY
ATTORNEY

United States Patent Office 3,100,293

Patented Aug. 6, 1963

3,100,293

SIGNALING SYSTEM

Renato A. D'Antonio, Kingston, and Fred Gerrand, Red Hook, N.Y., assignors to International Business Machines Corporation, New York, N.Y., a corporation of New York Filed Nov. 16, 1959, Ser. No. 853,400
11 Claims. (Cl. 340—146.1)

This invention relates to signaling systems used with counters, and more particularly to apparatus used for detecting misfunctioning in such counters.

It presently is the practice to provide a system in which each pair of successive stages of a binary counter have outputs connected to one of a group of common resolving or P circuits, where the resolving circuits jointly are effective to determine the parity of the number registered in the counter. Such an arrangement is shown and described in the Patent of Joseph J. Moyer, entitled "Switching Circuit," Patent Number 3,011,073, and assigned to the same assignee as the present invention.

In counters of the aforementioned type, it is conventional to provide in each stage a single gate conditioned by an output of the flip-flop individual to that stage for passing carry impulses from that stage to the complement input of the flip-flop of the next succeeding stage and to the carry gate input of that succeeding stage. Such an arrangement is shown in the patent of James V. Batley, entitled "Counter Checking Circuits," Patent Number 3,046,523, and also assigned to the same assignee as the present invention. While checking apparatus of the outlined type is sufficient to detect certain types of misfunction, namely, an odd total number of errors in the resolving circuits and parity-determining element, it does not indicate an even number of errors. Further, when an error in parity has been detected in a particular stage, the use of a single carry gate makes it impossible to identify the source; i.e., the failure of a flip-flop to resolve or a carry gate to function in the prescribed manner.

Therefore, it is an object of our invention to provide a new and improved signaling system.

Another object of our invention is to provide a new and improved system for detecting errors in counting circuits.

Another object of our invention is to provide a counter in which the logic of carry and complement operations in each stage can be checked separately.

Another object of our invention is to provide a new and improved signaling system for accurately locating a failing element within a counter.

Another object of our invention is to provide a new and improved signaling system capable of detecting errors in a counter as such errors occur.

Another object of our invention is to provide a new and improved signaling system capable of detecting errors in the carry operation between stages of a binary counter.

In a signaling system in which the preferred embodiment of our invention is practiced, there are provided a source of impulses and a counter. The source produces continuing, serially spaced apart impulses. The counter is of the binary type and is made of serially-related stages. Each stage has a bistable element and an input comprising the complement input of the stage's bistable element. The input of the first stage of the first group constitutes the input of the counter, and therefore is coupled to the aforementioned impulse source.

In accordance with the present invention, the counter is considered to be divided into adjacent, serially-related groups. Each group consists of an odd stage and the counter's next adjacent, even stage. In each group, there is provided first means including a gate which is selectively conditioned by the first stage's bistable element; for instance, from the 1 output of that element, for passing carry impulses from the first stage input to the second stage input in order to inter-relate the first and second stages of the same group. In order to inter-relate each group of stages in the counter to the next adjacent such group, there also is provided a second means including a second gate which is conditioned in parallel with the aforementioned first means gate, and a third gate which is selectively conditioned by the second stage bistable element, for instance, from the 1 output of that element. When its gates are both conditioned, the second means is effective for passing carry impulses from the first stage input to the input of the first stage within the next successive one of the groups of stages of the counter. With this arrangement, the failure of an element in any stage can be singularly identified by other detecting apparatus. For instance, the failure of a particular gate to function in its expected manner can be distinguished from the normal operation of flip-flops and vice versa.

A further part of the present invention is practiced by providing a bistable device to be associated with the counter for determining the parity of impulses produced by the aforementioned source. To this end, means is provided for coupling the source directly to the complement input of the parity bistable device. In addition to the apparatus set forth above in connection with the second stage of each group, there also is provided a fourth gate selectively conditioned by the second stage bistable element in opposition to the aforementioned second stage gate; i.e., from the 0 side of that flip-flop to be in keeping with the preferred arrangement already set forth. Recomplement means, including this fourth gate coupled to the aforementioned second gate of the first stage, is effective for selectively passing impulses from the first stage input of each group to the complement input of the parity determining bistable device. With this arrangement, when the counter stages adjacent to the counter input have an odd number of 1's stored therein, the parity-determining bistable device is complemented by the next impulse incoming from the source and thereafter recomplemented by the impulse from the aforementioned recomplement means, so that the status of the parity bistable device indicates the parity of impulses received from the source.

The foregoing and other objects, features and advantages of the invention will be apparent from the following more particular description of a preferred embodiment of the invention, as illustrated in the accompanying drawings.

Figure 1:
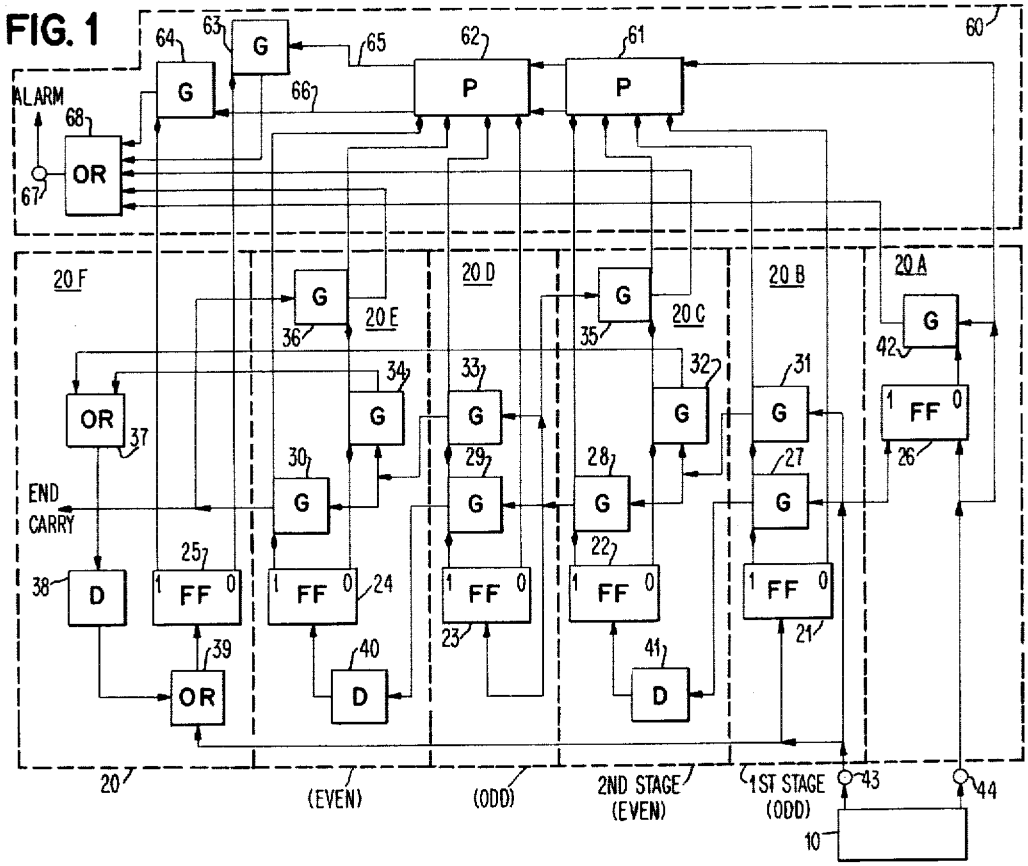
FIG. 1 shows in block schematic form a system incorporating a counter forming the preferred embodiment of the invention and checking apparatus for use therewith.

Throughout the following description and in the accompanying drawings there are certain conventions employed which are familiar to those skilled in the art. Additional information concerning these conventions is as follows:

In the drawing, a conventional, solid arrowhead is employed to indicate (1) a circuit connection, (2) energization with standard pulses, and (3) the direction of pulse travel which also indicates the direction of control. A solid, diamond-shaped arrowhead indicates (1) a circuit connection and (2) energization with a D.C. level. The input and output lines of the block symbols are connected to the most convenient side of the block. An input connected to a corner of a first block symbol may be continued along an edge of that block to a point on an adjacent block symbol, in order to illustrate the fact that the inputs of such blocks are intended to be energized in parallel from a common source. Bold-face character symbols appearing within a block symbol identify the common name of the circuit or element represented. For instance, FF indicates a flip-flop, G at gate or logical AND circuit, OR a logical OR circuit, and so on.

For simplicity of description, all pulses or significant levels hereinafter referred to are considered to be negative or negative going. The flip-flops, gates and OR circuits referred to in the following description may be of any suitable type, but preferably are of the type shown and described in copending application Serial No. 824,015, filed June 30, 1959, by Charles J. Tilton and entitled "A Synchronous Multiplier," and assigned to the same assignee as the present invention. The delay units or lines, indicated in the drawing by the letter D, also may be of any suitable type, but preferably are of the same general construction as shown in copending application Serial No. 471,002, filed November 24, 1954, by Harold D. Ross et al., entitled "Electronic Data Processing Machine," and assigned to the same assignee as the present invention. The P or resolution circuit shown as element 61 or 62 is of the type shown and described in the above-identified application of Joseph J. Moyer.

A flip-flop of the aforementioned type, when in 0 or 1 state, produces a positive, D.C. level signal on its corresponding output. In accordance with the particular use to which it is put, the flip-flop may have a binary 1 or "set" and a binary 0 or "reset" inputs shown connected to the 1 and 0 sides, respectively, of the flip-flop. In further accordance with particular use, the flip-flop may have another complement input shown connected between the 0 and 1 sides of the flip-flop. Energization of the aforementioned 0 and 1 inputs of any such flip-flop causes the flip-flop to assume its 0 or 1 state, respectively, while energization of the complement input shifts or complements the flip-flop from the existing to opposite state.

Turning first to the consideration of the apparatus shown in FIG. 1, there is provided an impulse source 10 for delivering continuing first and second trains of serially-related, spaced-apart impulses to terminals 43 and 44, respectively. These first and second train impulses are produced at identical rates, so that for every first train impulse there is a corresponding second train impulse. For convenience of description only, it is assumed that such impulses are not only of uniform width, but also are produced at a fixed rate. The nature of source 10 is such that each second train impulse is displaced in time from its corresponding first train impulse by an amount less than the time between the start of the next adjacent first train impulse. Further, the nature of source 10 is such that no second train impulse overlaps in time any first train impulse. It is the object of the next described apparatus, which includes counter 20, to count the number of first train impulses produced and delivered to terminal 43 by source 10. The impulses delivered to terminal 44 are used by apparatus employed for checking the operation of source 10 and other apparatus employed for checking the operation of counter 20. The remainder of the present specification is directed to the description of counter 20 and to both types of checking apparatus.

In the present description it is the object of the checking apparatus to produce an error-indicating impulse at alarm terminal 67 in the event that any of certain malfunctions are detected within counter 20 or source 10. Such impulses are lead out of the yet-to-be-described apparatus over various individual conductors and through OR circuit 68 to terminal 67. Impulse-responsive alarm indicating apparatus of any suitable type can be connected to terminal 67. While transmission of an impulse from any of a number of points is conveyed to common alarm terminal 67, sight should not be lost of the fact that the alarm-indicating impulses originate on individual conductors, and that as such, each of these impulses or combinations of impulses represent the particular malfunctions which are pointed out in the following paragraphs.

A check for missing impulses to terminal 43 is first described. From the description of source 10 set forth above, it is to be seen that a missing impulse on terminal 43 will be characterized by the transmission of two consecutive impulses to terminal 44 without the receipt of of an intervening impulse at terminal 43. To detect such a condition, there is provided missing pulse detecting apparatus 20A which includes flip-flop 26 and gate 42. Terminals 43 and 44 are coupled to the 1 and 0 inputs, respectively, of flip-flop 26, so that in ordinary circumstances, flip-flop 26 is driven between its 0 and 1 states by first and second train impulses appearing alternately on terminals 43 and 44, respectively. Gate 42 has a control input coupled to the 0 output of flip-flop 26, and a signal input coupled directly to the 0 input of flip-flop 26. With this arrangement, gate 42 is conditioned, i.e., made effective for passing impulses applied to its signal input, only when flip-flop 26 is in 0 state. The natures of flip-flop 26 and gate 46 are such that the resolving time of flip-flop 26, i.e., the time required to switch flip-flop 26 from a particular state to its opposite state, is greater than the width of pulses appearing at terminal 43. Under normal conditions, when each impulse applied to the 1 input of flip-flop 26 is effective to switch flip-flop 26 to its 1 state and the corresponding impulse on terminal 44 (as defined in connection with the description of source 10 set forth above), arriving at the signal input of gate 42 finds that gate deconditioned, since flip-flop 26 has not yet switched to its 0 state. After the impulse on the signal input has decayed to 0 level, flip-flop 26 is switched to its 0 state. The next succeeding impulse applied to terminal 43 is used to switch flip-flop 26 to its 1 state. Missing pulse indicating apparatus 20A continues to operate in this manner and, under these conditions, passage of an impulse through gate 42 is blocked, so that an alarm impulse is withheld from terminal 67. However, should an impulse have been missing from terminal 43, flip-flop 26 is allowed to remain in its 0 state during the time that it should have been switched to its 1 state. The arrival of the next checking impulse at terminal 44 and the signal input of gate 42 finds gate 42 conditioned, since flip-flop 26 already is in its 0 state. Accordingly, such an impulse is passed through gate 42 and travels over a conductor through OR circuit 68 to alarm indicating terminal 67.

Having shown how impulses missing from terminal 43 are detected, attention is next turned to the apparatus for counting connections provided. Counter 20 has a plurality of successive stages, such as 20B, 20C, 20D, and 20E. While counter 20 is shown to have four stages, it is to be understood that the number of stages can be changed from this without departing from the spirit of the present invention. These stages are regarded as being alternately odd and even, as indicated in the drawing. Each odd stage, such as 20B, and the next successive even stage, such as 20C, are regarded as a group, so that counter 20 can be considered to be a succession of such groups. Each such group is substantially identical to all others. Since the various groups of stages operate in substantially the same way, the operation of counter 20 is next explained in terms of the apparatus found in stages 20B and 20C wherever possible.

Each stage, such as 20C is provided with a bistable element, such as flip-flop 22 and has an input which comprises the complement input of that flip-flop. The input of first stage 20B of the first group of stages of counter 20 is the input of counter 20. Consequently, input terminal 43 is coupled directly to the input of first stage 20B as indicated in FIG. 1.

The application of impulses to the input of any stage of counter 20 is operative for complementing the bistable element of that stage and thereby registering the corresponding impulse count in that stage. Such an impulse comes from terminal 43, in the case of first stage 20B, and originates as a carry impulse from a preceding stage, in the case of all other register stages. In order to convey carry impulses from the first odd stage of any group, such as 20B, to the input of the second, even stage of the same group, means including a gate, such as 27, is provided. The last-named means also includes a delay line, such as 41, coupled in series with the aforementioned gate for purposes which are to be explained presently.

In the aforementioned first coupling means, gate 27 has a control input connected to the 1 output of flip-flop 21, so that gate 27 is conditioned to pass impulses applied to its signal input only when impulses are applied to that signal input and flip-flop 21 already is in its 1 state. At this point, it is stated that, as in the case of flip-flop 26 described in connection with missing pulse checking apparatus 20A, the flip-flops of the various stages of counter 20 are of such nature that their resolution time is greater than the time width of pulses applied to their complement inputs. Consequently, a gate, such as 27, having its control and signal inputs connected to the 1 output and to the complement input, respectively, of a flip-flop, such as 21, is conditioned and passes any impulse applied to the stage 20B input when such an impulse arrives at a time when flip-flop 21 is in its 1 condition. Thereafter, flip-flop 21 switches to its 0 state, so that the next impulse arriving at the stage input is blocked from passage through gate 27, even though flip-flop 21 consequently is switched to the 1 state by the same impulse. The aforementioned signal input of gate 27 is coupled to the complement input of the first stage flip-flop 21 and, therefore, to the input of stage 20B. As a result, the application of any impulse to the input of stage 20B when flip-flop 21 is in its 1 state conveys that impulse as a carry indication to the input of stage 20C, and causes flip-flops 21 and 22 of stages 20B and 20C to be complemented. If it is assumed that counter operation is started with the flip-flops of all stages in 0 state, it is to be seen that the flip-flops of the stages of each group are driven in repetitive binary cycles to assume all possible combinations as continued impulses are received at the input of the first stage of each such group.

In order to convey carry impulses through the second stage of each group to the first stage of the next succeeding group, for instance through stage 20C to stage 20D, there is provided means including second and third gates, such as 31 and 28, respectively, in each group of stages for coupling the input of the first stage of the group to the input of the first stage of the next succeeding group. The control and signal inputs of gate 31 are connected to the 1 output of flip-flop 21 and to the stage 20B input, respectively. Accordingly, gate 31 is conditioned in parallel with the aforementioned gate 27 and consequently is enabled to pass impulses when ever gate 27 is so enabled. The control input of gate 28 is connected to the 1 output of second stage 20C flip-flop 22. Gates 31 and 28 are serially connected to pass impulses when both gates are conditioned at the same time and an impulse is applied to the stage 20B input. With this arrangement of elements, it is to be seen that the means included in gates 31 and 28 is effective to pass carry impulses from the first stage input of the corresponding group to the first stage input of the next succeeding group only when an impulse applied to the input of the first stage within that group finds both flip-flops of the stages in the 1 state. Such an impulse passed through gates 31 and 28 is applied directly to the input of flip-flop 23, which is the input of stage 20D. It also is to be seen that the carry operation between stages of the same group is effected by gate means that is independent from the gate means used to effect carry operations between successive groups. The use of delay line 41 is next described. As previously mentioned, carry input impulses to gate 27 are passed to the complement input of flip-flop 22 by way of delay line 41, and carry impulses intended for the input of stage 20D are conveyed through gates 31 and 28. Since each gate has an inherent delay time, the resolution speed of the even stage flip-flop, such as 22, may be such that a condition known as "pulse dodging," in this case, the passing of unwanted carry impulses or the blocking of wanted carry impulses, could result under some conditions if delay line 41 should be omitted from the above-described first carry means. For instance, if it is assumed that delay line 41 is shorted out, that gates 27 and 31 have delays of 7 and 14 millimicroseconds, respectively, and that flip-flops 21 and 22 are in 1 state at the time an impulse appears at the input of stage 20B, there is a possibility that flip-flop 22 will have shifted to its 0 state and that the carry impulse intended for the input of stage 20D will be blocked at gate 28 by the time such a carry impulse has been passed through gate 31. Accordingly, delay line 41 is provided for the purpose of delaying impulses applied to the input of the flip-flops, such as 22, individual to the second stage of any group for a length of time sufficient to allow a carry impulse to be passed or blocked from passage from the input of the first stage of a particular group through the gates, such as 31 and 28 to the input of the first stage input of the next-succeeding group of stages prior to the time that the flip-flops of the second stage of the group under consideration are shifted.

From the above description, it is to be seen that the continued application of impulses at terminal 43 drives the various stages of counter 20 in binary fashion towards the capacity of the counter.

For the purposes of checking the operation of the counter, it is conventional to provide a bistable device, such as parity determining flip-flop 25 within counter 20 for determining the parity of impulses arriving at the counter input. Owing to the novel configuration of carry elements employed within counter 20, new and better apparatus for controlling parity flip-flop 25 is made possible. In the following description of such apparatus, it is assumed that odd parity is used; i.e., that the number of flip-flops in the 1 state among all counter 20 stages and the parity determining flip-flop 25 always is odd. It is to be understood that the system can be made to work equally well using even parity.

In order to drive parity determining flip-flop 25, there is provided means including OR circuit 39 for coupling the input of counter 20 to the complement input of parity flip-flop 25. With this arrangement, each incoming impulse complements parity flip-flop 25. However, when the number of flip-flops in an odd number of stages adjacent to the counter 20 input (i.e., the least significant stages of counter 20) are in 1 condition, the next succeeding impulse registered within counter 20 does not change the parity of the counter flip-flops. In order to make parity flip-flop 25 reflect this unchanged parity status of the counter, there is provided means including a fourth gate, such as 32 and 34, coupled to the 0 output of each even stage flip-flop. It is to be noticed that gate 32 is conditioned in opposition to the above-described second means gate, such as 28, of the same stage. The signal input of gate 32 is coupled to the output of the above-described gate 31, so that the two may be regarded as being connected in series. With gate 31 connected as described above, gate 32 is effective for passing to the complement input of flip-flop 25 by way of OR circuit 37 and delay line 38 and OR circuit 39 impulses which have been blocked at gate 28. It is to be noted that each successive group or pair of stages is provided with a gate corresponding to the above-described gate 32, and that each such gate has an output separately connected to an input of OR circuit 37, so that parity indicating flip-flop 25 always reflects the parity of the flip-flops within the various stages of counter 20.

In order to check the parity of the flip-flops of the various counter 20 stages against the parity of incoming impulses as reflected by the status of parity indicating flip-flop 25, a so-called P circuit, such as 61, is provided for each group of stages. In the case of the counter illustrated in FIG. 1, P circuits 61 and 62 have control inputs connected to the flip-flops of the stages within the successive groups of stages and have their resolution circuits connected in series as set forth in the aforementioned application of Moyer. Terminal 44 is coupled to the resolving input of serially-connected P circuits 61 and 62, so that each check impulse incoming to terminal 44 is passed through the various elements of circuits 61 and 62 at a time subsequent to the resolutions of the flip-flops of the various counter 20 stages and after the condition of circuits 61 and 62 has been changed to reflect the change effected in counter 20. As a result of the impulse received from terminal 44, an impulse is produced on even output 65 if an even number of counter 20 flip-flops are in 1 condition, or an impulse is produced on odd output 66 if an odd number of counter 20 flip-flops are in 1 condition. In order to check the parity of the input impulses against the parity of the counter 20 flip-flops as determined by circuits 61 and 62 and control the passage of an alarm indicating impulse to terminal 67, means including gates 63 and 64 is provided. The control input of gates 63 and 64 are connected to the 0 and 1 outputs, respectively, of flip-flop 25. Gate 63 is used for coupling even output conductor 65 of the P circuits to alarm terminal 67 through OR circuit 68, while gate 64 is used for coupling odd output conductor 66 of the P circuits to alarm terminal 67 through OR circuit 68. From the above description of the P circuit and flip-flop 25, it is to be seen that at any point in the operation of counter 20, the receipt of an even number of impulses at terminal 43 should result in placing flip-flop 25 in 1 state and the transmission of an impulse to even output conductor 65. If such is the case, the impulse on conductor 65 is blocked from passage to alarm terminal 67 at gate 63. Similarly, if an odd number of impulses has been received at terminal 43, so that an odd number of counter flip-flops are in 1 condition, flip-flop 25 should be in its 0 state and an impulse produced on odd output conductor 66. If such is the case, this impulse is blocked from passage to terminal 67 at gate 64. However, if the status of flip-flop 25 does not agree with the parity of the counter 20 flip-flops, as indicated by the signal on one of outputs 65 and 66 of circuits 61 and 62, such a signal is passed by the conditioned one of gates 63 and 64 to alarm terminal 67 over one of the previously-traced circuits.

In order to check the operation of the above-described apparatus for transmitting carry impulses through a second stage of a group of stages, there is provided a fourth gate, such as 35 and 36, in the second stage of each of the aforementioned groups of stages. Gate 35 has a control input connected to the 0 output of flip-flop 22, and so is conditioned in parallel with the above described gate 32 and in opposition to gate 28, which is a part of the previously-described second carry means. Gate 32 is effective for passing impulses from gate 31 which are also passed through the 1 gate 28. The passage of an impulse through gates 28 and 35 indicates a misfunction of apparatus, such as the failure of gate 28 to become deconditioned when its controlling flip-flop 22 is in 0 state. Impulses passed by gate 35 and other corresponding gates within other stage groups, such as 34, are transmitted over separate conductors through OR circuit 68 to alarm indicating terminal 67.

Within the above-described system, it has been explained how missing pulse detecting apparatus 20A is effective to transmit an impulse to alarm indicating apparatus which includes alarm terminal 67. The other described counter checking means is effective for detecting other types of misfunction in counter elements. For instance, failure of the first carry means gate 31 of second carry means gate 27 to become conditioned or become deconditioned in the manner set forth is detected when the resulting missetting of the counter 20 flip-flops is detected by the above explained comparison of the parity of incoming pulses from source 10 against the parity of the counter 20 flip-flops as determined by P circuits 61 and 62. Should second carry means gate, such as 28, fail to pass an impulse, such failure also is detected by the aforementioned parity comparison. In the event a flip-flop, such as 21 or 22, in any group of stages fails to complement, such an error shows up in the aforementioned parity comparison. In the event that a second carry means gate, such as 28, always passes pulses; i.e., fails to become deconditioned when flip-flop 22 returns to 0 state, the outgoing impulse from gate 28 samples gate 35, which now is conditioned by the 0 output of flip-flop 22. The ability of both gates 28 and 35 to pass the same impulse indicates a failure in gate 28 to become deconditioned when flip-flop 22 is in its 1 state, and the resulting alarm pulse passed to terminal 67 is indicative of such a failure.

In the above-described counter 20, which has an even number of stages, it is to be seen that should the end carry gate 30 of the final counter stage misfunction, such an error would be detected in the parity check operation already described. However, when a counter similar to counter 20, but having an odd number of stages is considered, such an end carry error is not discernible in this manner. Accordingly, a modification of the described structure of FIG. 1 may be provided in the configuration set forth in FIG. 2.

Figure 2:
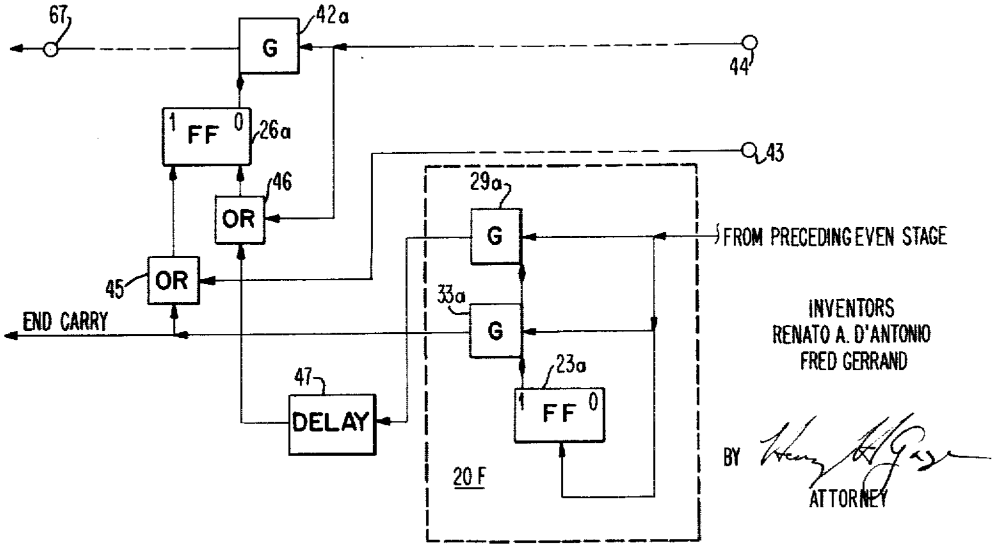
FIG. 2 shows in block schematic form a modification of a part of a system using a counter similar to the one shown in FIG. 1.

Referring to FIG. 2, there is provided a counter of the general type set forth above, but which has a final odd stage 20F. Stage 20F is similar in most respects to any of the above-described odd stages, such as 20D, of counter 20. The end carry operation is effected by gate **33*a*, which is connected to and conditioned by the 1 output of flip-flop 23*a*, and is operative to deliver a carry impulse transmitted to stage 20F from the next preceding, even stage to the end carry conductor in the already described manner set forth in connection with transmission of carry impulses through the odd stages of counter 20. Flip-flop 23*a* also is effective for conditioning gate 29*a* in parallel with gate 33*a*, so that any impulse admitted through gate 33*a* also should be admitted through gate 29*a*. Flip-flop 26*a* is to the counter considered in FIG. 2 what flip-flop 26 is to the counter 20. Flip-flop 26*a*, like its counterpart, in its 0 state enables gate 42*a* to pass an impulse from terminal 44 to alarm-indicating terminal 67. In order to make flip-flop 26*a* and gate 42*a* operative to pass such an impulse when an error occurs in the end-carry operation of the counter suggested in FIG. 2, the output of gate 29*a* is connected through delay line 47 and OR circuit 46 to the 0 input of flip-flop 26*a*, and the output of gate 33*a* is conveyed through OR circuit 45 to the 1 input of flip-flop 26*a*. With this arrangement, and the end-carry gates in operative condition, flip-flop 26*a* is complemented by the impulse passed through gate 33*a* and OR circuit 45, and then re-complemented by the delayed impulse passed through gate 29*a*, delay line 47 and OR circuit 46. Under these conditions gate 42*a* is not conditioned when a check impulse appears on terminal 44, so that passage of such a check impulse through gate 42*a* to alarm terminal 67 normally is blocked. Failure of gate 33*a* to transmit an impulse results in flip-flop 26*a* being complemented only once, so that the subsequent appearance of a check impulse on terminal 44 finds flip-flop 26*a* in its 0 state and gate 42*a* consequently conditioned to pass impulses to alarm indicating terminal 67** in a manner similar to the one previously described.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a counter for registering the number of impulses produced by a source, a series of groups of stages, each of counting said groups consisting of a first stage and a second stage, each of said stages having a bistable element and an input comprising the complement input of said bistable element, first carry means including a gate selectively conditioned by said first stage bistable element operable for passing carry impulses from said first stage input to said second stage input, second carry means including another gate conditioned in parallel with said first means gate and a gate selectively conditioned in accordance with the condition in which said second stage bistable element has been placed for passing carry impulses from said first stage input to said input of said first stage within the next successive one of said groups of stages.

2. The count set forth in claim 1 wherein said first carry means also includes a device for delaying the transmission of a carry impulse to said second stage input for an interval sufficient to allow said second carry means to convey an impulse to said input of said first stage within the next successive one of said groups of stages.

3. In a signaling system, a binary counter having serially-related alternate odd and even stages for registering the number of impulses produced by a source; each of said stages having a bistable device which includes a complement input and first and second outputs, an input comprising said complement input of said bistable device, and a first gate coupled to and enabled by said first output of said bistable device of the same one of said stages; each odd stage having in addition a second gate coupled to and enabled in parallel with said first gate of the same one of said stages; a plurality of first carry means; each of said first carry means including said first gate of particular ones of said odd stages for coupling said input of that one of said stages to said input of the next adjacent, even one of said stages; a plurality of second carry means; each of said second carry means including said second gate of an odd one of said stages coupled in series with the said first gate of the next adjacent, even one of said stages; each of said second carry means being effective for coupling said input of the corresponding odd one of said stages to said input of the next odd one of said stages in said counter.

4. The signaling system set forth in claim 3 wherein each of said first connecting means includes a device coupled in series with said first gate of each of said first odd stages for delaying the transmission of impulses for a time interval sufficient to allow an impulse to be transmitted or blocked by the corresponding one of said second carry means.

5. The system set forth in claim 3 wherein each of said stages has sampling means including an additional gate coupled to said second flip-flop output of the same one of said stages and enabled in opposition to said first gate of the same one of said stages, each of said sampling means being effective for sampling the output of a particular one of said second carry means, and having in addition alarm means common to said counter stages, said sampling means in enabled condition being effective for passing impulses produced by said second carry means to said alarm means to render said alarm means operative.

6. In a signaling system; a source for producing serially-related impulses; a binary counter having an input coupled to said source and a plurality of serially-related, successive odd and even stages effective for registering the number of impulses produced by said source; each of said stages having a bi-stable device which includes a complement input and first and second outputs, an input comprising said complement input of said bistable device, and a first carry gate coupled to and enabled by said first output of said bistable device of the same one of said stages; each odd one of said stages having in addition a second carry gate coupled to and enabled in parallel with said first gate of the same one of said stages; means for coupling said counter input to said input of the first of said stages of said counter; a plurality of first carry means; each of said first carry means including said first gate of an odd one of said stages for coupling said input of the same one of said stages to said input of the next adjacent, even one of said stages; a plurality of second carry means; each of said second carry means including said second gate of one of said odd stages coupled in series with said first gate of the next adjacent, even one of said stages; each of said second carry means being effective for coupling said input of an odd one of said stages to said input of the next odd one of said stages in said counter.

7. In a signaling system, a source of impulses, a counter having an input coupled to said source and a plurality of elements for registering the count of impulses delivered by said source, first parity means including a bistable device, means coupling the complement input of said bistable device to said source and to said counter effective for driving said bistable device to a status reflecting the parity of impulses delivered from said source to said counter, second parity means coupled to the output of said counter effective upon the registration of each impulse count within said counter for assuming a status reflecting the parity status of elements within said counter, and means coupled to and controlled by said parity means for comparing the status of said bistable device to the status of said second parity means.

8. The system set forth in claim 7 and having in addition alarm means and wherein said second parity means is effective for producing an impulse in accordance with the parity status of said counter elements, and said comparing means is effective for coupling said second parity means to said alarm means, said comparing means being effective for passing an impulse to said alarm means when the status of said first and said second parity means indicates a difference in parity between the impulses applied to the input of said counter and the count registered by said counter.

9. In a signaling system, a source of impulses, a binary counter having an input coupled to said source and a plurality of bistable devices for registering the number of impulses delivered from said source, first parity means including a bistable device, means coupling said source and said counter elements to the complement input of said first parity bistable device effective for driving said bistable device to reflect the parity of impulses received from said source, second parity means coupled to said counter elements and having odd and even outputs, said second parity means being effective upon the registration of each count in said counter an impulse for producing an impulse on said even or said odd output in accordance with the parity status of said counter elements, comparing means including first and second gates conditioned by the 0 and 1 outputs, respectively, of said first parity means device, impulse responsive means for indicating an alarm condition, said first and said second gates being effective for coupling said first and said second parity means outputs, respectively, to said alarm means.

10. In a signaling system, source of impulses, bistable device for determining the parity of impulses produced by said source, means for coupling said source to the complement input of said parity bistable device, a counter having an input coupled to said source, said counter comprising a series of substantially identical groups of stages for registering the number of impulses produced by said source, each of said groups consisting of a first stage and a second stage, each of said stages including a bistable element which includes a complement input as well as first and second outputs, each stage further including an input comprising the complement input of said stage bistable element, first carry means including a first gate coupled to said bistable element first output selectively conditioned in accordance with the condition of said first stage bistable element for passing carry impulses to said second stage input, second carry means including a second gate conditioned in parallel with said first gate and a third gate selectively conditioned by said second stage bistable element for passing carry impulses to said input of said first stage within the next successive one of said groups of stages, and third coupling means including a gate selectively conditioned in opposition to said third gate by said second stage bistable element for selectively passing impulses passed by said second gate to the complement input of said parity determining bistable device.

11. The signaling system set forth in claim 10 and having in addition second parity means effective subsequent to the registration of each impulse from said source within said counter for assuming a condition in accordance with the parity status of said bistable devices within all of said stages, and comparing means controlled by said first and said second parity means for detecting a difference in parity of impulses applied to said counter input and the parity status of the elements of said counter.

References Cited in the file of this patent

UNITED STATES PATENTS

| | | |
|---|---|---|
| 2,719,959 | Hobbs | Oct. 4, 1955 |
| 2,884,625 | Kippenhan | Apr. 28, 1959 |
| 2,894,684 | Nettleton | July 14, 1959 |
| 2,897,480 | Kumagai | July 28, 1959 |
| 2,904,781 | Katz | Sept. 15, 1959 |

FOREIGN PATENTS

Publication: I.B.M. Technical Bulletin, vol. 2, No. 3, October 1959, page 24.

UNITED STATES PATENT OFFICE

CERTIFICATE OF CORRECTION

Patent No. 3,100,293 August 6, 1963

Renato A. D'Antonio et al.

It is hereby certified that error appears in the above numbered patent requiring correction and that the said Letters Patent should read as corrected below.

Column 8, line 73, after "of", second occurrence, insert -- counting --; line 74, strike out "counting".

Signed and sealed this 4th day of August 1964.

(SEAL)
Attest:

ERNEST W. SWIDER
Attesting Officer

EDWARD J. BRENNER
Commissioner of Patents